April 22, 1924.
L. BARRETT
RADIUS ROD
Filed May 15, 1923
1,491,658
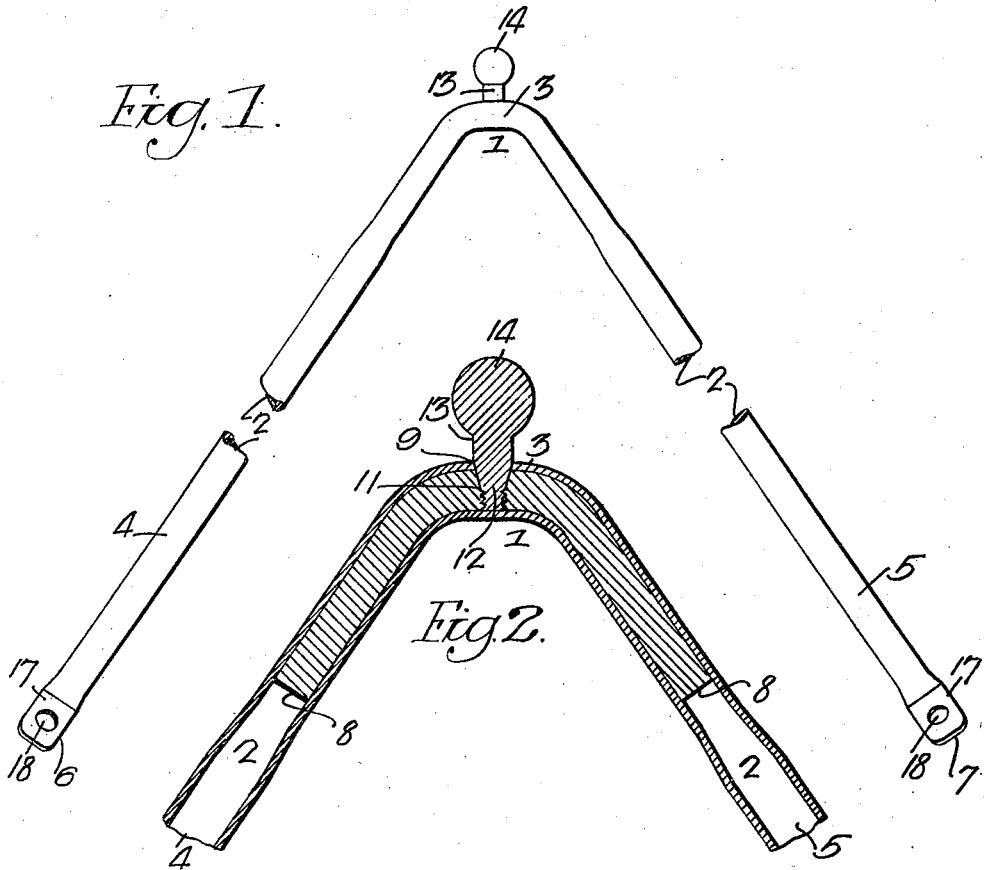
Inventor-
Leon Barrett.
by his Attorneys.
Howson & Howson Patented Apr. 22, 1924.

1,491,658

UNITED STATES PATENT OFFICE.

LEON BARRETT, OF PHILADELPHIA, PENNSYLVANIA.

RADIUS ROD.

Application filed May 15, 1923. Serial No. 639,116.

*To all whom it may concern:*

Be it known that I, LEON BARRETT, a citizen of the United States, residing in Philadelphia, Pennsylvania, have invented Radius Rods, of which the following is a specification.

My invention relates to bracing fixtures and, more especially, to radius rods particularly applicable to motor driven vehicles.

In its broadest aspect, the object of my invention is to provide a one-piece radius rod, which is characterized by its simplicity of design and rigidness of construction and which lends itself to quantity production methods of manufacture, wherein slight improvements, though resulting in only a small reduction in the total cost of the finished article, in the aggregate, involve very appreciable sums of money.

A disadvantage of certain forms of prior art radius rod constructions is the multiplicity and the size of the parts constituting the same, and a general tendency for the parts to work loose and rattle. A further disadvantage is the weak construction of the bent portion of the radius rod which serves as one of the supporting points therefor.

According to my invention, I provide a one-piece radius rod construction, adapted to overcome the above-noted undesirable characteristics, comprising a continuous piece of tubing having a bent portion and outwardly extending side portions, the bent portion having rigidly secured therein a reinforcing member provided with a boring extending to the outer surface of the radius rod for the reception of an end portion of a supporting element. The radius rod end portions are also reinforced by telescoping members, which are rigidly secured therein and which are adapted to be secured to a supporting structure.

Fig. 1 is a side elevational view of one form of embodiment of my invention;

Fig. 2 is a longitudinal sectional detail view of the reinforced curved portion of the structure of Fig. 1;

Fig. 3 is a similar view of the reinforced end portions, and

Fig. 4 is a view similar to Fig. 3, but showing a modification.

In the illustrated embodiment of my invention shown in Fig. 1, a radius rod construction I comprises a continuous piece of tubing 2 having a curved base portion 3 and outwardly extending diverging side portions 4 and 5, terminating in end portions 6 and 7, respectively. The curved base portion 3 may be reinforced by a metal bar 8 which is rigidly secured therein by swedging or by brazing.

The curved portion 3 may be pivotally mounted on a supporting fixture (not shown) by providing the curved portion 3 of the tubing 2 with a perforation 9 and the reinforcing member 8 with a tapered boring 11 registered therewith, for the reception of a tapered end portion 12 of a pin 13. The connection between the pin 13 and the reinforcing member 8 may be made more secure by providing the boring 11 and the pin portion 12 with threaded base portions, as shown in Fig. 2. The remaining end portion of the pin 13 has rigidly secured thereto a ball member 14 constituting one element of the usual ball and socket joint. In practice, the reinforcing member 8 is rigidly secured within the portion of the tubing I designed to constitute the curved portion thereof before the tubing is bent, while the perforation 9 and the boring 11 are made subsequent to the bending operation.

The end portions 6 and 7 of the radius rod, which are to be secured to a supporting structure (not shown), may be reinforced by positioning therein reinforcing members 16. The reinforcing members 16 may be rigidly secured in position and the radius rod end portions formed to a desired shape by swedging the same to provide flattened portions 17, as shown in Fig. 1. The flattened portions 17 may be provided with perforations 18 for the reception of bolts or other means for securing the end portions 6 and 7 of the radius rod to the supporting structure (not shown).

The modification shown in Fig. 4 differentiates over the reinforced end construction shown in Fig. 1 by the provision of a tubular member 19 in the perforation 18 having shoulder portions 21 and 22 engaging the opposite sides of the flattened tubular end portions. In actual practice, the reinforced end structure just defined may be made by inserting the tube 19 in the perforation 18 and then swedging the end portions thereof to form the construction shown in Fig. 4.

While I have shown two embodiments of my invention, for the purpose of describing the same and illustrating its principles of construction and arrangement, it is apparent that various changes and modifications may be made in the nature and the details of construction thereof without departing from the spirit of my invention. I desire, therefore, that only such limitations shall be imposed thereon as are indicated in the appended claims or as are demanded by the prior art.

I claim:

1. A radius rod comprising a continuous piece of tubing having a curved portion and outwardly extending side portions, a member in telescopic engagement with said curved portion for reinforcing the same, and independent means extending from said curved reinforced portion for supporting the same.

2. A radius rod comprising a continuous piece of tubing having a curved portion and outwardly extending side portions, a reinforcing member rigidly secured within said curved portion, said curved portion and reinforcing means having a boring, and a supporting member having one end rigidly secured in said boring.

3. A one piece radius rod comprising a continuous piece of tubing having a curved portion and outwardly extending side portions, a reinforcing member rigidly secured within the curved portion of said tubing, said curved portion being perforated and said reinforcing member provided with a tapered boring registering with said perforation, a supporting element for said curved portion having one end thereof rigidly positioned in said tapered boring, and a bearing element rigidly secured to the other end of said supporting element.

4. A radius rod comprising a continuous piece of tubing having a curved portion and outwardly extending side portions, a reinforcing member positioned within the curved portion of said tubing, a supporting member having an end thereof rigidly secured in said reinforcing member, and members mounted in the end portions of said tubing for reinforcing the same, said end portions being adapted to be secured to a supporting structure.

5. A one piece radius rod comprising a continuous piece of tubing having a curved portion and outwardly extending side portions, a reinforcing member rigidly secured within the curved portion of said tubing, said curved portion being perforated and said reinforcing member provided with a tapered boring registering with said perforation, a supporting element for said curved portion having one end thereof rigidly positioned in said tapered boring, a bearing element rigidly secured to the other end of said supporting element, and members mounted in the end portions of said tubing for reinforcing the same, said end portions being adapted to be secured to a supporting structure.

LEON BARRETT.